United States Patent
Lin et al.

(10) Patent No.: US 7,578,375 B2
(45) Date of Patent: Aug. 25, 2009

(54) HYDRAULIC BRAKE LEVER

(75) Inventors: Yi-Hsien Lin, Changhua (TW);
Shih-Ching Ke, Changhua (TW)

(73) Assignee: Lee Chi Enterprises Co., Ltd., Changhua (TW)

( * ) Notice: Subject to any disclaimer, the term of this patent is extended or adjusted under 35 U.S.C. 154(b) by 0 days.

(21) Appl. No.: 12/208,257

(22) Filed: Sep. 10, 2008

(65) Prior Publication Data
US 2009/0120751 A1    May 14, 2009

(30) Foreign Application Priority Data
Nov. 12, 2007   (TW) ............................. 96219071 U

(51) Int. Cl.
*B60T 11/00* (2006.01)
(52) U.S. Cl. .................................................... 188/344
(58) Field of Classification Search ............. 188/152, 188/344; 60/547.1
See application file for complete search history.

(56) References Cited

U.S. PATENT DOCUMENTS

| | | | | |
|---|---|---|---|---|
| 4,560,049 A | * | 12/1985 | Uchibaba et al. | 192/85 R |
| 6,003,639 A | * | 12/1999 | Buckley et al. | 188/26 |
| 7,380,646 B1 | * | 6/2008 | Takachi | 188/344 |
| 2005/0056508 A1 | * | 3/2005 | Laghi | 188/344 |
| 2007/0051575 A1 | * | 3/2007 | Lumpkin | 188/344 |

* cited by examiner

*Primary Examiner*—Christopher P Schwartz
(74) *Attorney, Agent, or Firm*—patenttm.us

(57) ABSTRACT

A hydraulic brake lever includes a body having a bladder chamber, a cavity and a flexible separator mounted between the bladder chamber and the cavity. The flexible separator holds hydraulic oil in a front section of the body and prevents a rear section of the body from contacting with the pressurized hydraulic oil. A cylinder is mounted in the cavity of the body and accommodates a piston set. Thus, a high pressure is kept in the cylinder and is not applied directly on the body. Due to the separating design, the hydraulic oil applied a low pressure on the body. Thus, manufacturing the body is less limited and a manufacturing cost is reduced.

20 Claims, 5 Drawing Sheets

HYDRAULIC BRAKE LEVER

BACKGROUND OF THE INVENTION

1. Field of Invention

The present invention relates to a brake lever, and more particularly to a hydraulic brake lever using a flexible separator to hold hydraulic oil in a front section of the hydraulic brake lever.

2. Description of the Related Art

Because a hydraulic brake system has a high brake force and can provide safe and stable brake effects, the hydraulic brake system is often used on high priced bicycles. A conventional hydraulic brake system comprises a brake lever mounted on a handlebar of a bicycle, a disc brake mounted beside a wheel of the bicycle and a hydraulic tube connected to the brake lever and the disc brake.

A conventional brake lever comprises a body have a cavity and an oil chamber for accommodating a piston set and hydraulic oil. Because the brake lever will apply a high pressure on the hydraulic oil when braking, the body must be manufactured by forging to prevent the body from breaking or leaking. Thus, manufacturing the conventional brake lever is complicated and time-consuming and a manufacturing cost is expensive and cannot satisfy the demands of the bicycle industry and consumers.

To overcome the shortcomings, the present invention provides a hydraulic brake lever to mitigate or obviate the aforementioned problems.

SUMMARY OF THE INVENTION

The primary objective of the present invention is to provide a hydraulic brake lever using a flexible separator to hold the hydraulic oil in a front section of the hydraulic brake lever.

A hydraulic brake lever in accordance with the present invention comprises a body having a bladder chamber, a cavity and a flexible separator mounted between the bladder chamber and the cavity. The flexible separator holds the hydraulic oil in the front section of the body and prevents a rear section of the body from contacting with the pressurized hydraulic oil. A cylinder is mounted in the cavity of the body and accommodates a piston set. Thus, a high pressure is kept in the cylinder and is not applied directly on the body. Due to the separating design, the hydraulic oil applied a low pressure on the body. Thus, manufacturing the body is less limited and a manufacturing cost is reduced.

Other objectives, advantages and novel features of the invention will become more apparent from the following detailed description when taken in conjunction with the accompanying drawings.

DETAILED DESCRIPTION OF THE INVENTION

Figure 1:
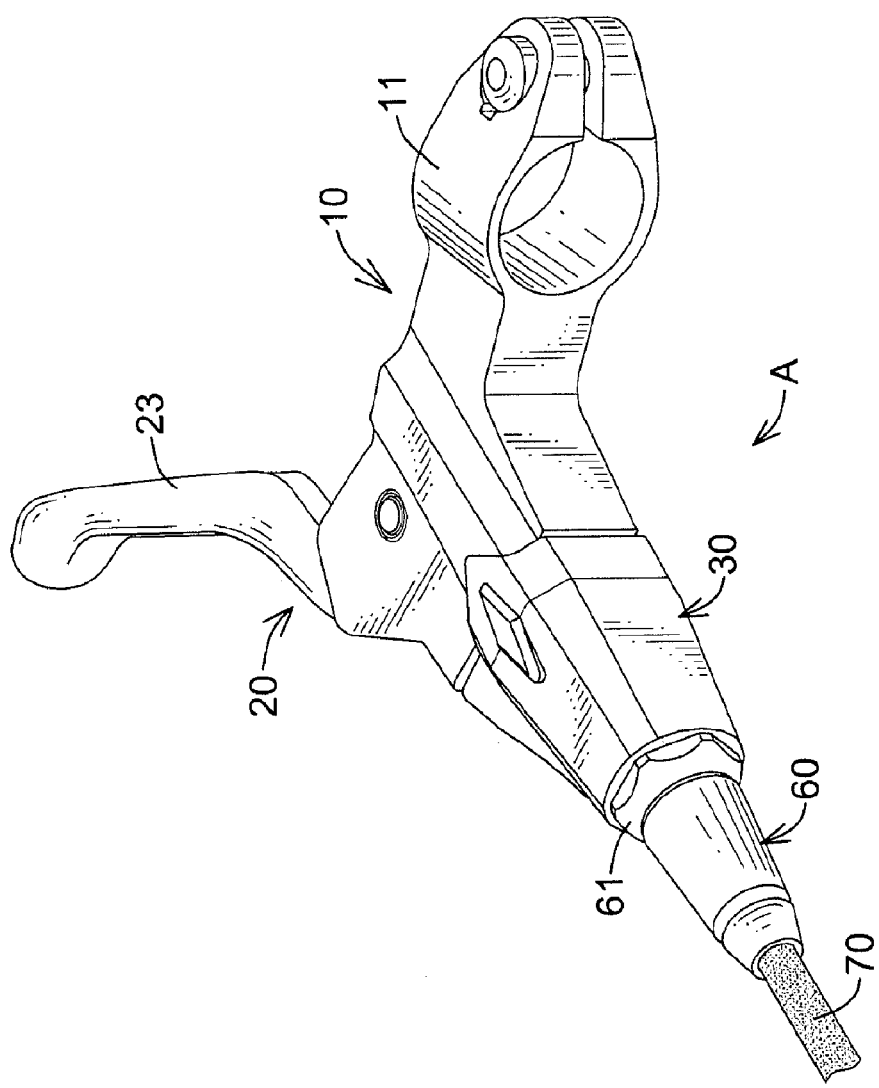
FIG. 1 is a perspective view of a hydraulic brake lever in accordance with the present invention.
Figure 2:
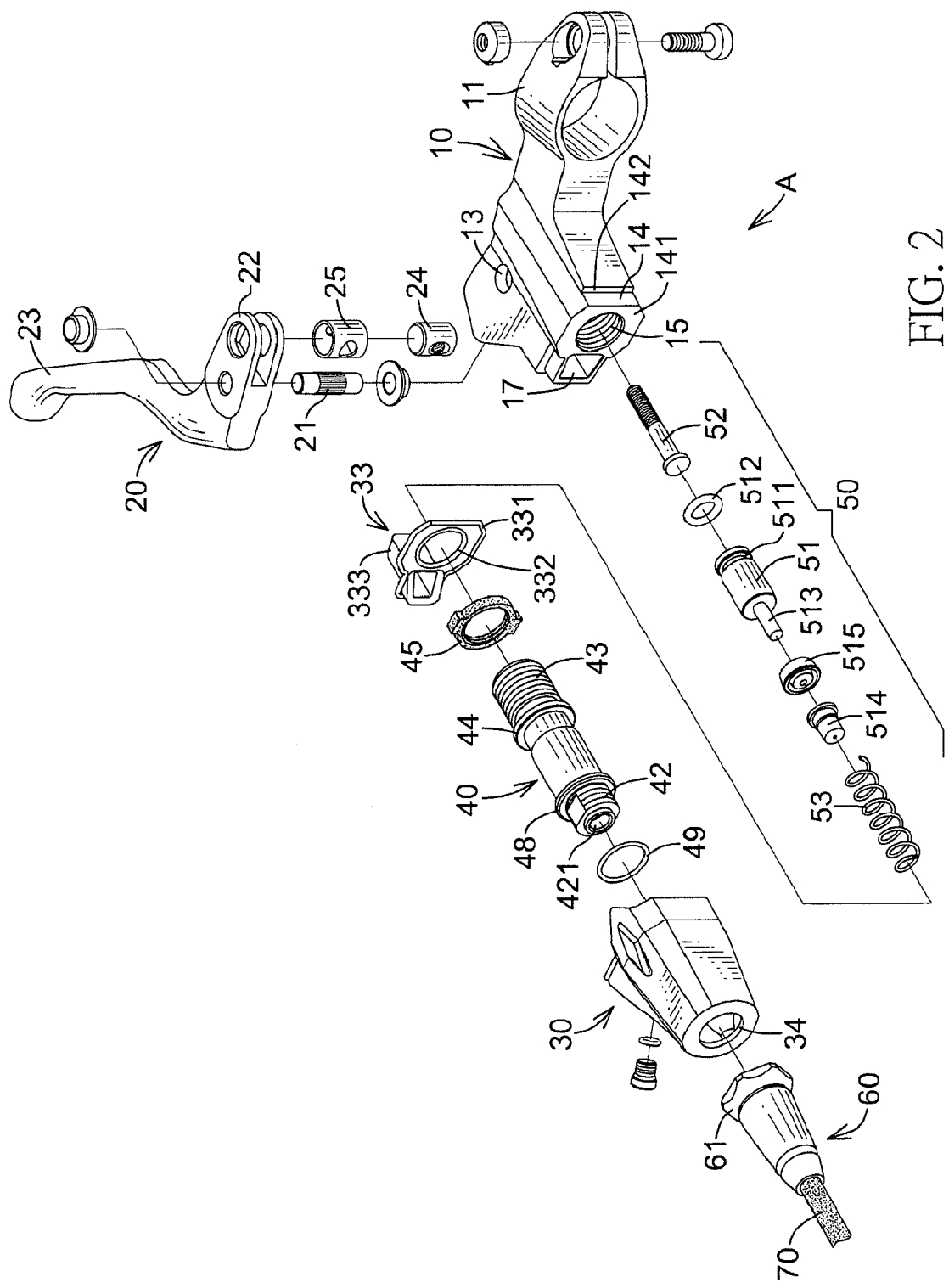
FIG. 2 is an exploded perspective view of the hydraulic brake lever in FIG. 1.
Figure 3:
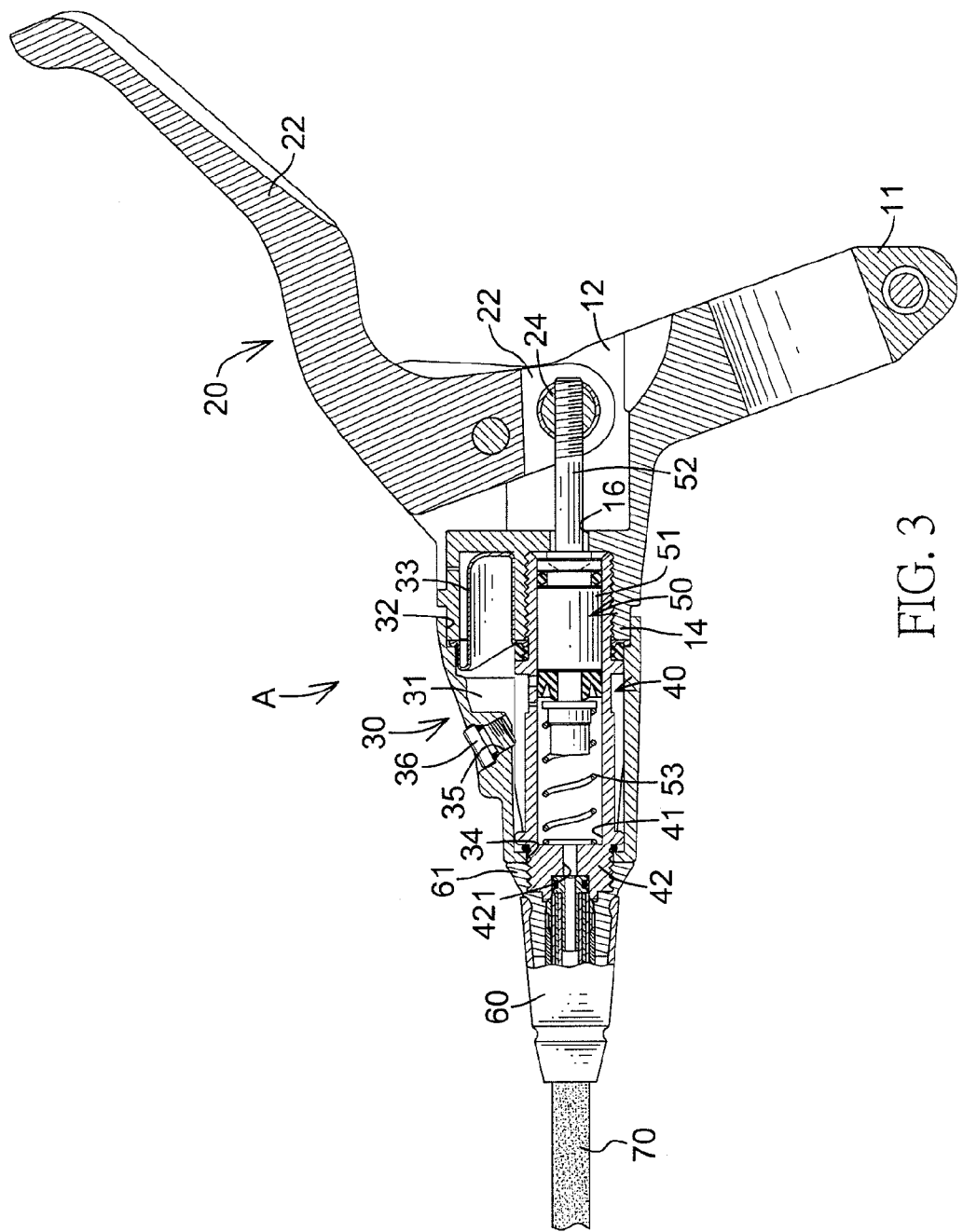
FIG. 3 is a top view in partial cross section of the hydraulic brake lever in FIG. 1.

With reference to FIGS. 1 to 3, a hydraulic brake lever in accordance with the present invention comprises a body (A), a lever bar (20), a cylinder (40), a piston set (50), a cover (60) and a hydraulic tube (70).

The body (A) has a front section and a rear section, may be formed integrally as one piece and may comprise a base member (10), a flexible separator (33) and a cavity member (30). The base member (10) may be manufactured as one piece by die-casting and is disposed in the rear section of the body (A). The base member (10) has a front end, a rear end, two sides, a connecting section (11), a mounting groove (12), a pivoting hole (13), an abutting section (14), a receiving chamber (15), a rod hole (16) and a bladder chamber (17). The connecting section (11) is formed in one of the sides of the base member (10) and may be mounted on a handle bar of a bicycle. The mounting groove (12) is formed in the other side of the base member (10). The pivoting hole (13) is defined through the base member (10) and communicates with the mounting groove (12). The abutting section (14) is formed on the front end of the base member (10), is disposed between the sides of the base member (10) and has an end face (141) and a shoulder (142). The end face (141) is formed in the front end of the base member (10). The shoulder (142) is formed in the front end of the base member (10) and is disposed beside the end face (141) of the abutting section (14). The receiving chamber (15) is defined in the front end of the base member (10), is disposed in the end face (141) of the abutting section (14) and has a bottom and an inner thread. The rod hole (16) is defined through the bottom of the receiving chamber (15) along coaxially the receiving chamber (15) and communicates with the mounting groove (12). The bladder chamber (17) is defined in the front end of the base member (10), is disposed beside the receiving chamber (15) and may be substantially rectangular.

The flexible separator (33) may be made of flexible materials such as rubber or silicone. The flexible separator (33) abuts the end face (141) of the abutting section (14) and has an edge, a sealing flange (331), a through hole (332) and a bladder (333). The sealing flange (331) is formed along the edge of the flexible separator (33) and extends around the receiving and bladder chambers (15, 17). The through hole (332) is defined through the flexible separator (33) and corresponds to the receiving chamber (15). The bladder (333) is formed integrally on the flexible separator (33) and is mounted in and spaced from the bladder chamber (17) of the base member (10) so the bladder (333) can expand in the bladder chamber (17) and is used for receiving hydraulic oil.

The cavity member (30) is disposed in the front section of the body (A) and may be manufactured as one piece by forging. The cavity member (30) abuts the flexible separator (33) and has a front end, a rear end, an outer surface, a cavity (31), a connecting section (32), a connecting hole (34) and an oil hole (35). The cavity (31) is defined in the rear end of the cavity member (31) and communicates with the bladder (333) of the flexible separator (33). The connecting section (32) is formed on the rear end of the cavity member (30) around the cavity (31), engages the abutting section (14) of the base member (10) and abuts the sealing flange (331) of the flexible separator (33) so the cavity (31) is sealed by the sealing flange (331). The connecting hole (34) is defined through the front end of the cavity member (30) and communicates with the cavity (31). The oil hole (35) is defined through the outer surface of the cavity member (30) and communicates with the cavity (31). The oil hole (35) may be threaded and may be closed by a threaded plug (36).

The lever bar (20) is mounted pivotally on the base member (10) of the body (A) and has a pivot (21), a drive section (22), a bar section (23), a drive member (24) and a sleeve (25). The pivot (21) is mounted in the pivoting hole (13) of the base member (10). The drive section (22) is mounted in the mounting groove (12) of the base member (10) and is connected to the pivot (21). The bar section (23) is connected to the drive section (22) and protrudes from the base member (10). The drive member (24) is mounted in the drive section (2) and has a threaded bore aligned with the rod hole (16). The sleeve (25) is mounted between the drive member (24) and the drive section (22) to allow the drive member (24) to move with good flexibility.

Figure 4:
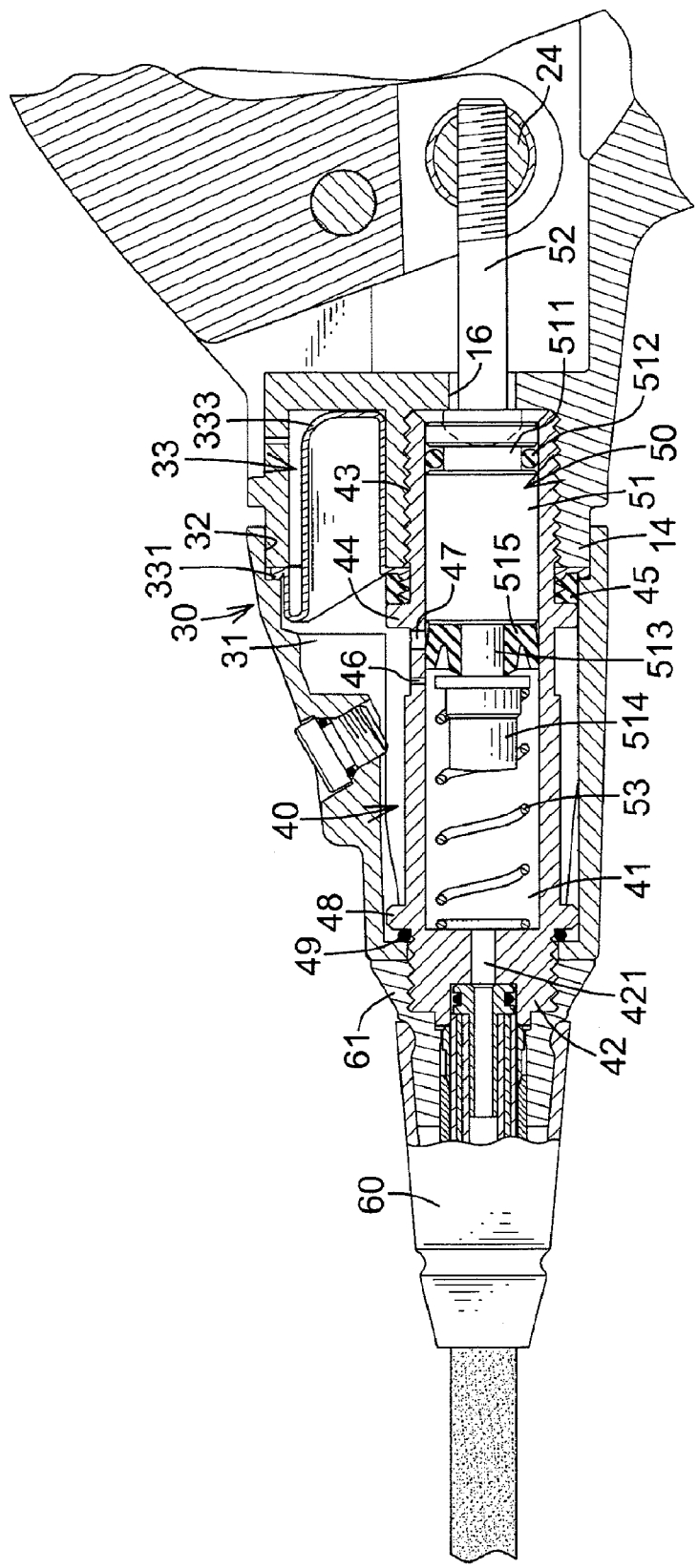
FIG. 4 is an enlarged top view in partial cross section of the hydraulic brake lever in FIG. 1.

With further reference to FIG. 4, the cylinder (40) is cylindrical and is mounted in the cavity (31) of the cavity member (30). The cylinder (40) has a front end, a rear end, an outer surface, a cylinder chamber (41), a cylinder head (42), a threaded section (43), an abutting flange (44), a washer (45), a guide hole (46), a lead hole (47), a mounting flange (48) and a sealing ring (49). The cylinder chamber (41) is defined longitudinally in the rear end of the cylinder (40) and communicates with the rod hole (16) of the base member (10). The cylinder head (42) is formed on the front end of the cylinder (40), protrudes from the front end of the cavity member (30) and has an outer thread and a flow channel (421). The flow channel (421) is defined through the cylinder head (42) and communicates with the cylinder chamber (41). The threaded section (43) is formed on the rear end of the cylinder (40), extends through the through hole (332) of the flexible separator (33) and is screwed into the receiving chamber (15) of the base member (10). The abutting flange (44) is formed around the cylinder (40) near the rear end and clamps the flexible separator (33). The washer (45) is mounted between the abutting flange (44) and the flexible separator (33) to increase a sealing effect and prevent the flexible separator (33) from being damaged when screwing the cylinder (40) into the receiving chamber (15). The guide and lead holes (46, 47) are defined through the outer surface of the cylinder (40) and communicate the cylinder chamber (41) with the cavity (31). The mounting flange (48) is formed around the cylinder (40) near the front end and faces the rear end of the cavity member (30). The sealing ring (49) is mounted between the mounting flange (48) and the rear end of the cavity member (30) to provide a sealing effect.

The piston set (50) is mounted in the cylinder (40) and comprises a piston (51), a push rod (52) and a spring (53). The piston (51) is mounted movably in and spaced from the cylinder chamber (41) of the cylinder (40) and faces the lead hole (47) of the cylinder (40) so as to allow the hydraulic oil to be filled between the piston (51) and the cylinder (40) through the lead hole (47). Thus, the piston (51) can move smoothly in the cylinder chamber (41). The piston (51) has a front end, a rear end, an annular groove (511), a sealing ring (512), a shaft (513), an end cap (514) and an oil-stopping ring (515). The annular groove (511) is formed in the rear end of the piston (51). The sealing ring (512) is mounted in the annular groove (511) and is mounted between the piston (51) and the cylinder (40). The shaft (513) is formed coaxially on the front end of the piston (51). The end cap (514) is mounted on the shaft (513). The oil-stopping ring (515) is mounted around the shaft (513), is disposed between the end cap (514) and the piston (51) and may have a front face and an annular groove defined in the front face. The push rod (52) is connected to the rear end of the piston (51), extends through the receiving chamber (15) and the rod hole (16) of the base member (10) and is screwed into the threaded bore of the drive member (24) of the lever bar (20). Thus, the lever bar (20) can drive the push rod (52) to move by forcing the drive member (24). The spring (53) is mounted in the cylinder chamber (41) between the piston (51) and the front end of the cylinder (40) to provide the piston (51) with a returning force.

The cover (60) is mounted on the front ends of the cavity member (30) and the cylinder (40) and has a positioning nut (61). The positioning nut (61) is screwed on the cylinder head (42) of the cylinder (40) to position the cavity member (30) between the cover head (60) and the base member (10).

The hydraulic tube (70) communicates with the flow channel (421) of the cylinder head (42) and is connected to a disc brake of a disc brake system. Thus, the lever bar (20) can drive the disc brake through the hydraulic tube (70).

Figure 5:
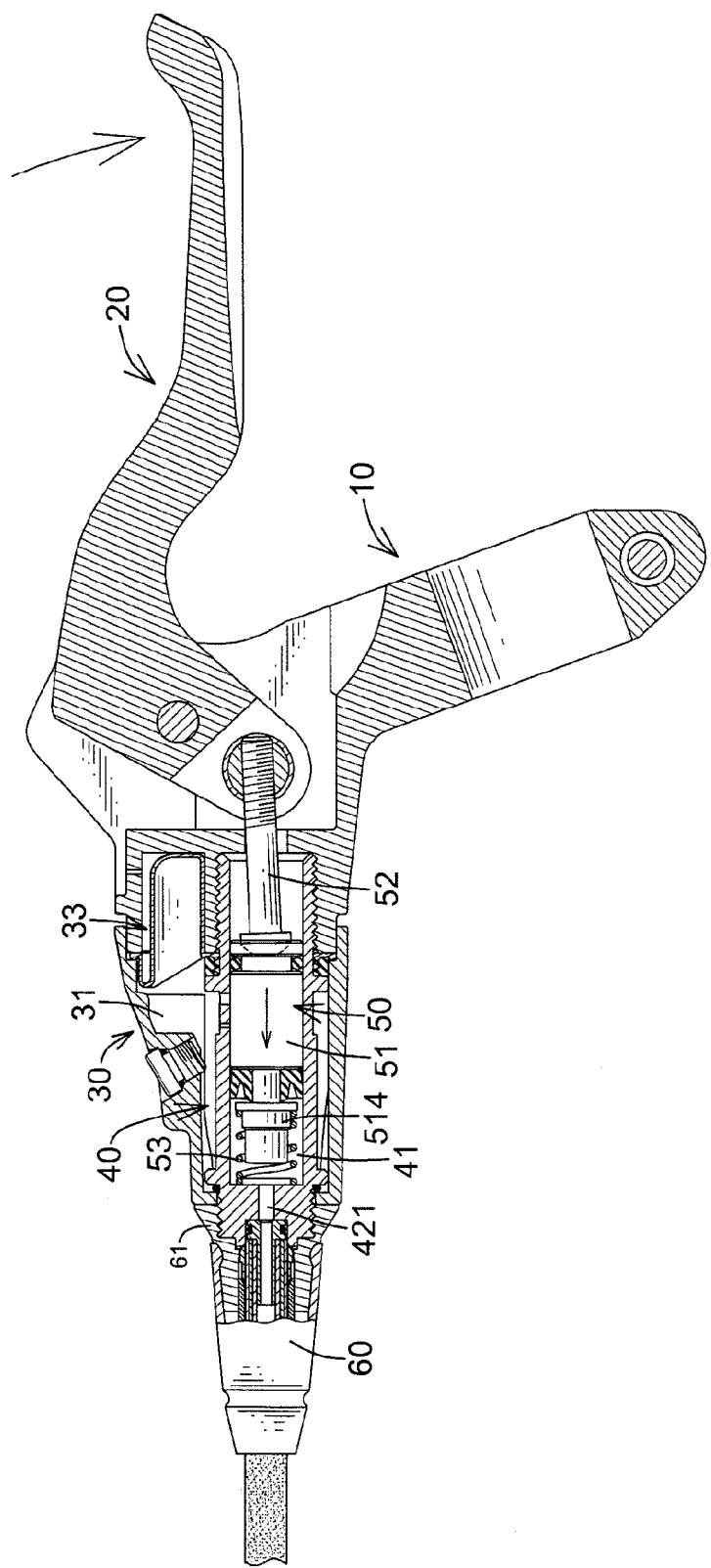
FIG. 5 is an operational enlarged top view in partial cross section of the hydraulic brake lever in FIG. 1.

With reference to FIGS. 3 and 5, when the hydraulic brake lever is in use, the hydraulic oil is filled into the cavity (31) of the cavity member (30) and the cylinder chamber (41) of the cylinder (40) with an oil storage capacity of the bladder (333) of the flexible separator (33). When a user pulls the bar section (23) of the lever bar (20), the lever bar (20) drive the push rod (42) to move the piston (51) forwards through the drive member (24). The piston (51) presses the hydraulic oil to pass through the hydraulic tube (70) and actuate the disc brake of the disc brake system to provide a braking effect. When the user releases the bar section (23) of the lever bar (20), the spring (53) of the piston set (50) pushes components of the hydraulic brake lever back to their original positions.

With reference to FIGS. 3 and 4, the hydraulic brake lever uses the flexible separator (33) to prevent the pressurized hydraulic oil from contacting directly with the base member (10). Thus, the base member (10) can be manufactured by simple, fast and cheap processes such as die-casting. Additionally, due to the structure design of the cylinder (40), a pressure applying on the cavity member (30) is lower than that on the cylinder (40). Therefore, manufacturing the cavity member (30) is less limited and a manufacturing cost is also reduced.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A hydraulic brake lever comprising
    a body having
        a front section;
        a rear section;
        a receiving chamber being defined near the rear section of the body and having a bottom and an inner thread;
        a cavity being defined near the front section of the body;
        a bladder chamber;
        a flexible separator being mounted between the bladder chamber and the cavity and having a through hole defined through the flexible separator and corresponding to the receiving chamber;
        a rod hole being defined through the bottom of the receiving chamber along coaxially the receiving chamber; and
        a cavity member being disposed in the front section of the body and having a front end and a rear end;
    a lever bar being mounted pivotally on the body;
    a cylinder being mounted in the cavity and having
        a front end;
        a rear end;
        an outer surface;

a cylinder chamber being defined longitudinally in the rear end of the cylinder and communicating with the rod hole of the body;

a cylinder head being formed on the front end of the cylinder, protruding from the front end of the cavity member and having an outer thread and a flow channel defined through the cylinder head and communicating with the cylinder chamber;

a threaded section being formed on the rear end of the cylinder, extending through the through hole of the flexible separator and being screwed into the receiving chamber of body; and a guide hole being defined through the outer surface of the cylinder and communicating the cylinder chamber with the cavity; and a piston set being mounted in the cylinder and comprising a piston being mounted movably in the cylinder chamber of the cylinder;

a push rod extending through the receiving chamber and the rod hole of the body and being connected to the piston and the lever bar; and a spring being mounted in the cylinder chamber of the cylinder to provide the piston with a returning force.

2. The hydraulic brake lever as claimed in claim 1, wherein the body comprises a base member being disposed in the rear section of the body and having a front end, a rear end and two sides;

the mounting groove is formed in one of the sides of the base member;

the receiving chamber is defined in the front end of the base member; and the cavity is defined in the rear end of the cavity member.

3. The hydraulic brake lever as claimed in claim 2, wherein the bladder chamber is defined in the front end of the base member and is disposed beside the receiving chamber; and the flexible separator has a bladder formed integrally on the flexible separator and mounted in the bladder chamber of the base member.

4. The hydraulic brake lever as claimed in claim 3, wherein the bladder is spaced from the bladder chamber of the base member.

5. The hydraulic brake lever as claimed in claim 4, wherein the flexible separator has an edge and a sealing flange formed along the edge of the flexible separator.

6. The hydraulic brake lever as claimed in claim 5, wherein the base member has an abutting section formed on the front end of the base member; and the cavity member has a connecting section formed on the rear end of the cavity member around the cavity and engaging the abutting section of the base member.

7. The hydraulic brake lever as claimed in claim 6, wherein the lever bar has a drive member having a threaded bore aligned with the rod hole of the base member; and the push rod of the piston set is screwed into the threaded bore of the drive member.

8. The hydraulic brake lever as claimed in claim 7, wherein the hydraulic brake lever further has a cover mounted on the front ends of the cavity member and the cylinder and having a positioning nut screwed on the cylinder head of the cylinder.

9. The hydraulic brake lever as claimed in claim 8, wherein the cylinder has an abutting flange formed around the cylinder and clamping the flexible separator.

10. The hydraulic brake lever as claimed in claim 9, wherein the cylinder has a washer mounted between the abutting flange and the flexible separator.

11. The hydraulic brake lever as claimed in claim 10, wherein the cylinder has a lead hole defined through the outer surface of the cylinder and communicating the cylinder chamber with the cavity; and the piston faces the lead hole of the cylinder.

12. The hydraulic brake lever as claimed in claim 11, wherein the piston has a front end;

a rear end;

an annular groove being formed in the rear end of the piston;

a sealing ring being mounted in the annular groove;

a shaft being formed coaxially on the front end of the piston;

an end cap being mounted on the shaft; and an oil-stopping ring being mounted around the shaft and being disposed between the end cap and the piston.

13. The hydraulic brake lever as claimed in claim 12, wherein the cavity member has an outer surface and an oil hole defined through the outer surface of the cavity member, communicating with the cavity and closed by a threaded plug.

14. The hydraulic brake lever as claimed in claim 1, wherein the cylinder has an abutting flange formed around the cylinder and clamping the flexible separator.

15. The hydraulic brake lever as claimed in claim 14, wherein the cylinder has a washer mounted between the abutting flange and the flexible separator.

16. The hydraulic brake lever as claimed in claim 15, wherein the cylinder has a lead hole being defined through the outer surface of the cylinder and communicating the cylinder chamber with the cavity; and the piston faces the lead hole of the cylinder.

17. The hydraulic brake lever as claimed in claim 16, wherein the piston has a front end;

a rear end;

an annular groove being formed in the rear end of the piston;

a sealing ring being mounted in the annular groove;

a shaft being formed coaxially on the front end of the piston;

an end cap being mounted on the shaft; and an oil-stopping ring being mounted around the shaft and being disposed between the end cap and the piston.

18. The hydraulic brake lever as claimed in claim 17, wherein the cavity member has an outer surface and an oil hole defined through the outer surface of the cavity member, communicating with the cavity and closed by a threaded plug.

19. The hydraulic brake lever as claimed in claim 1, wherein the piston has
- a front end;
- a rear end;
- an annular groove being formed in the rear end of the piston; and
- a sealing ring being mounted in the annular groove.

20. The hydraulic brake lever as claimed in claim 19, wherein the piston has
- a shaft being formed coaxially on the front end of the piston;
- an end cap being mounted on the shaft; and
- an oil-stopping ring being mounted around the shaft and being disposed between the end cap and the piston.

* * * * *